United States Patent
Ho et al.

(10) Patent No.: US 6,961,068 B2
(45) Date of Patent: Nov. 1, 2005

(54) METHOD FOR CONVERTING MONOCHROME IMAGES

(75) Inventors: Tai-Shui Ho, Taipei Hsieng (TW); Shih-Kuang Tsai, Taipei Hsieng (TW); Li Li, Shanghai (CN); Jian-Feng Tu, Taipei Hsieng (TW); Xin-Ke Shi, Shanghai (CN)

(73) Assignee: Inventec Appliances Corporation, Taipei (TW)

( * ) Notice: Subject to any disclaimer, the term of this patent is extended or adjusted under 35 U.S.C. 154(b) by 6 days.

(21) Appl. No.: 10/688,916

(22) Filed: Oct. 21, 2003

(65) Prior Publication Data

US 2005/0083342 A1 Apr. 21, 2005

(51) Int. Cl.⁷ .................................................. G09G 5/02
(52) U.S. Cl. ........................................ 345/600; 345/589
(58) Field of Search ................................. 345/589, 596, 345/597, 598, 600, 601, 603; 382/274, 162, 167; 358/1.9, 518

(56) References Cited

U.S. PATENT DOCUMENTS

| | | | | | |
|---|---|---|---|---|---|
| 4,688,031 | A | * | 8/1987 | Haggerty | 345/600 |
| 5,751,921 | A | * | 5/1998 | Fujimoto | 345/600 |
| 5,867,593 | A | * | 2/1999 | Fukuda et al. | 382/176 |
| 5,872,864 | A | * | 2/1999 | Imade et al. | 382/176 |
| 6,091,505 | A | * | 7/2000 | Beaman et al. | 358/1.2 |
| 2003/0103241 | A1 | * | 6/2003 | Sharma | 358/3.06 |
| 2004/0126029 | A1 | * | 7/2004 | Sakuyama et al. | 382/240 |

* cited by examiner

*Primary Examiner*—Matthew Luu
(74) *Attorney, Agent, or Firm*—Birch, Stewart, Kolasch & Birch, LLP

(57) ABSTRACT

A method for converting monochrome images to color images. A monochrome image is blocked first, and pixel values of monochrome image blocks are obtained by statistical analysis. The monochrome image is then processed by layered mapping and color values of equal grayscale layers thereof are obtained. Finally, each monochrome image block is matched to a color of a corresponding equal grayscale layer.

10 Claims, 5 Drawing Sheets

| Pixel Values of MCU | | | | |
|---|---|---|---|---|
| B4 | B3 | B2 | B1 | |
| 0 | 0 | 0 | 0 | Block 1 |
| 0 | 1 | 0 | 1 | Block 2 |
| 1 | 0 | 1 | 0 | Block 3 |
| ⋮ | ⋮ | ⋮ | ⋮ | ⋮ |
| 1 | 1 | 0 | 1 | Block n |

| Layer | Color Values | | | | Color |
|---|---|---|---|---|---|
| 1 | 0 | 0 | 0 | 0 | Black |
| 2 | 0 | 0 | 0 | 1 | Blue |
| 3 | 0 | 0 | 1 | 0 | Green |
| 4 | 0 | 0 | 1 | 1 | Cyan |
| 5 | 0 | 1 | 0 | 0 | Red |
| 6 | 0 | 1 | 0 | 1 | Pinkish Red |
| 7 | 0 | 1 | 1 | 0 | Yellow |
| 8 | 0 | 1 | 1 | 1 | Gray |
| 9 | 1 | 0 | 0 | 0 | Black |
| 10 | 1 | 0 | 0 | 1 | Dim Blue |
| 11 | 1 | 0 | 1 | 0 | Dim Green |
| 12 | 1 | 0 | 1 | 1 | Dim Cyan |
| 13 | 1 | 1 | 0 | 0 | Dim Red |
| 14 | 1 | 1 | 0 | 1 | Dim Pinkish Red |
| 15 | 1 | 1 | 1 | 0 | Dim Yellow |
| 16 | 1 | 1 | 1 | 1 | White |

FIG. 6

METHOD FOR CONVERTING MONOCHROME IMAGES

BACKGROUND OF THE INVENTION

1. Field of the Invention

The present invention relates to a method for image processing, and in particular to a method for converting monochrome images, such as grayscale or bitmap images, to color images, using in color systems.

2. Description of the Related Art

Images can be displayed in monochrome or color, in which monochrome images may comprise several black and white pixels, with each pixel being represented by a logical bit. In practice, monochrome images are widely used in industry, and are convenient for identifying characteristics and models, because of their smaller file size.

To display monochrome signals on color monitors, a computer system may convert monochrome pixel data to corresponding color pixel data. For example, a computer system may convert each logical bit of a monochrome signal to color pixel data in RGB 888 format. The computer system may then generate color display signals to a color display monitor based on the converted color pixel data.

Thus, it is necessary to develop a method for converting monochrome images for use in color systems while maintaining features thereof.

SUMMARY OF THE INVENTION

Accordingly, an object of the present invention is to provide a method for converting monochrome images to color images.

According to the object described, the present invention provides a method for converting monochrome images to color images. First, a monochrome image is blocked in accordance with a minimum calculating unit (MCU) of 2×2, 4×4 or 8×8, pixel values of which are obtained by statistical analysis. The monochrome image is then processed by layered mapping to obtain equal grayscale layers thereof, color values of which are obtained according to a fixed grayscale level. Next, the monochrome image blocks match colors corresponding to the equal grayscale layers according to the color values and the pixel values, such that a color image is obtained.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 6 is a color contrast table for transforming monochrome pixels into corresponding colors according to the present invention.

DETAILED DESCRIPTION OF THE INVENTION

The invention disclosure provides a method for coloring monochrome images.

Figure 1:
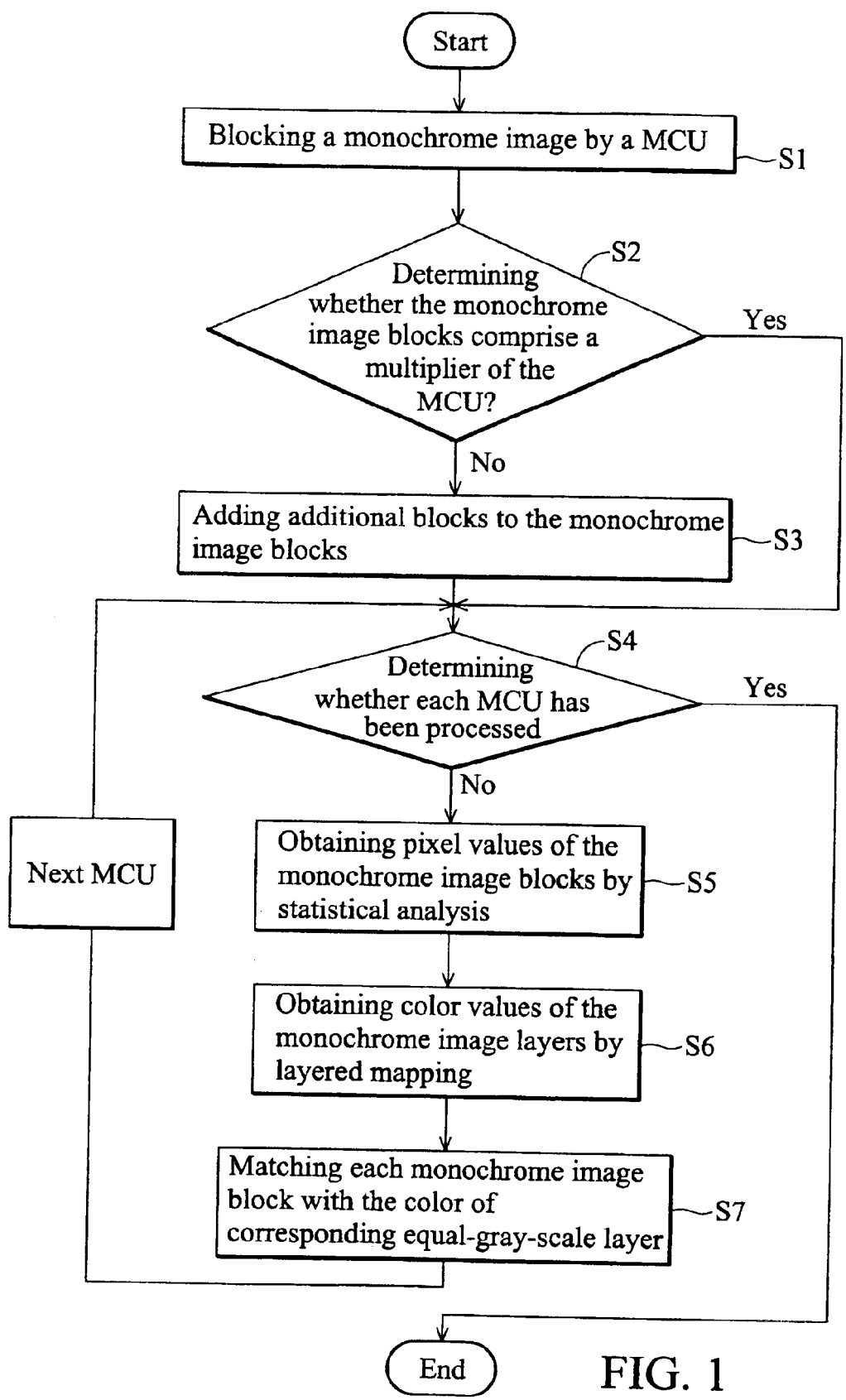
FIG. 1 is a schematic diagram of the method for converting monochrome images to color images according to the present invention.

FIG. 1 is a schematic diagram of the method for converting monochrome images to color images according to the present invention.

Figure 2A:
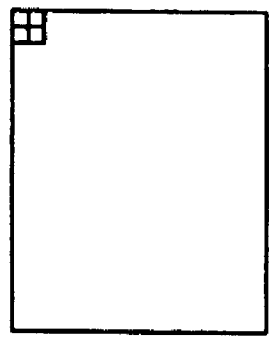
FIG. 2A~2C are schematic diagrams showing a monochrome image blocked in accordance with a minimum calculating unit of 2×2, 4×4 or 8×8 according to the present invention.
Figure 2B:
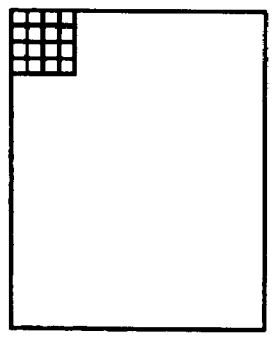
Figure 2C:
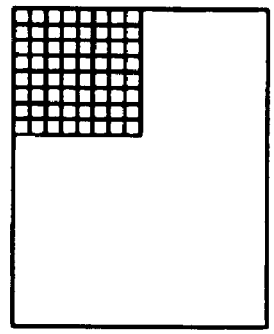

In step S1, a desired monochrome image is blocked by 4×4 blocks, a minimum calculating unit, shown in FIG. 2B. A monochrome image can be blocked by a minimum calculating unit of 2×2, 4×4 or 8×8 as shown in FIG. 2A~2C, to which the embodiment of the present invention is not limited.

In step S2, it is determined whether the monochrome image blocks comprise a multiplier of the minimum calculating unit. If so, the process goes to step S3, and, if not, to step S4.

Figure 3:
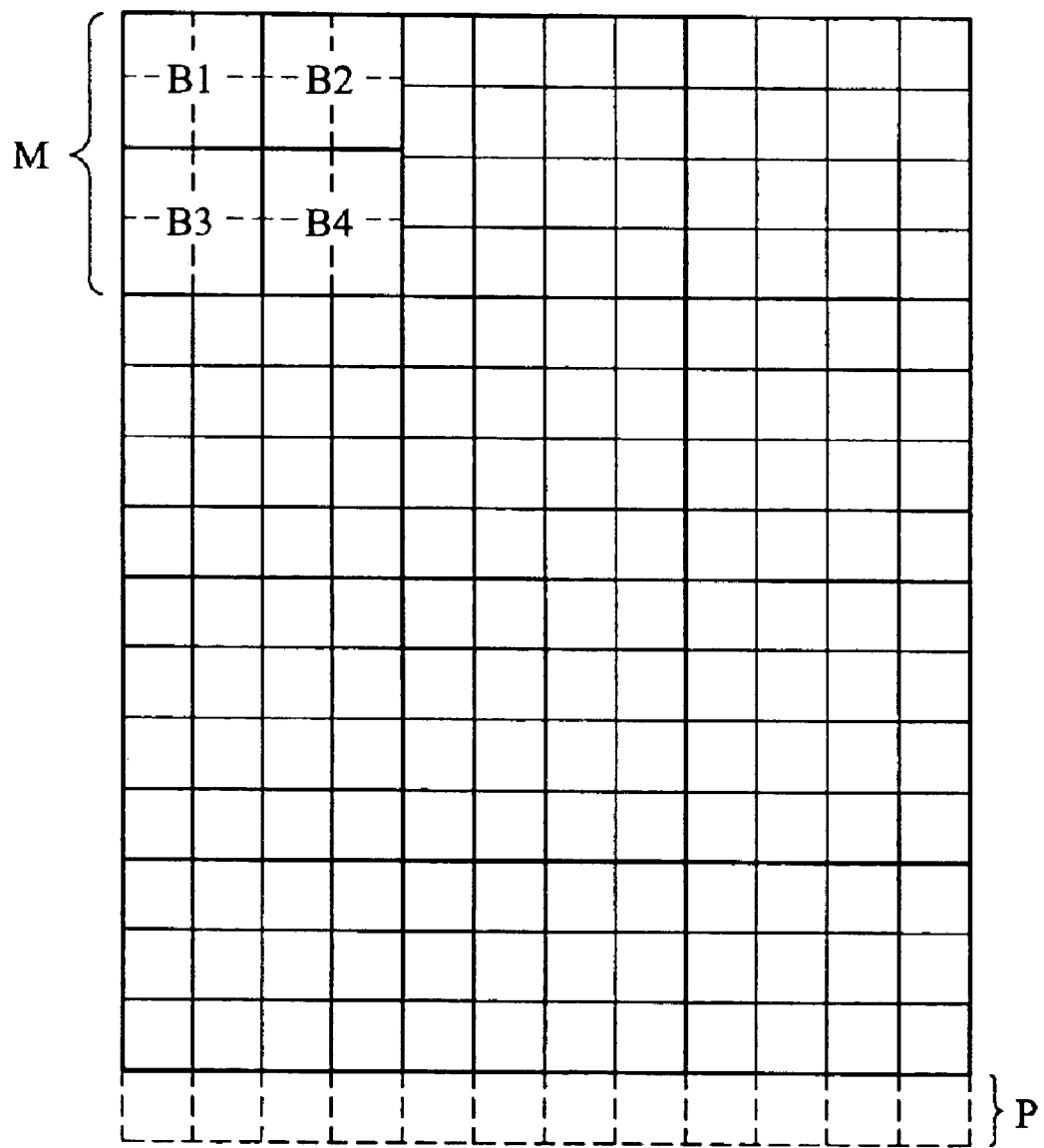
FIG. 3 is a schematic diagram of pixel values of a calculating unit obtained by statistical analysis according to the present invention.

In step S3, additional blocks P are added to the monochrome image blocks, becoming a multiplier of the minimum calculating unit. As shown in FIG. 3, the monochrome image is blocked in accordance with the minimum calculating unit M by 4×4 blocks, and additional blocks P are added if the monochrome image blocks do not comprise a multiplier of the minimum calculating unit.

In step S4, it is determined whether each monochrome image block has been processed, such that each block is assigned a corresponding color. If so, the process is ended, and, if not, the process goes to step S5.

In step S5, pixel values of the monochrome image blocks are obtained by statistical analysis, defined in accordance with the number of the minimum calculating unit. According to the embodiment of the present invention, the monochrome image is blocked by 4×4 blocks (block 1, block 2, . . . , block 16) requiring selection of sixteen colors for mapping, in which the 4×4 blocks are further blocked of 2×2 blocks for better accuracy, and blocks B1, B2, B3 and B4 of block 1 are obtained, as shown in FIG. 3. Next, block B1, having four sub-blocks, each referring to a pixel, obtains pixel values thereof. Thus, the pixel value of the block B1 is obtained by averaging the four pixel values of the four sub-blocks and then pixel values of the block B2, B3 and B4 are obtained using the same method. Thus, the pixel value of the 4×4 block, the block 1, is obtained using the above method, as well as blocks 2 to 16, shown in FIG. 4.

Figures 4, 5:
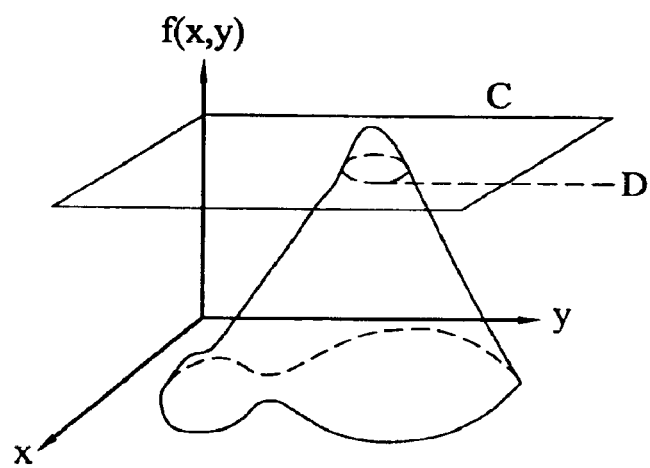
FIG. 4 is a schematic diagram of a pixel bit table with pixel values of monochrome image blocks according to the present invention.
FIG. 5 is a schematic diagram showing the method for obtaining color values of monochrome image blocks by layered mapping according to the present invention.

In step S6, color values of the monochrome image layers are obtained by layered mapping. As shown in FIG. 5, a monochrome image can be represented by a brightness function f(x, y) in a 2D coordinate system, and layer C parallel to the xy-plane is obtained when f(x, y) refers to height in the 2D coordinate system. Layer C intersects the brightness function f(x, y), whose intersection is a contour line referring to an equal grayscale line D, in which the layer number is defined by desired image quality.

Sixteen colors are thus chosen for mapping and sixteen layers C, referring to equal grayscale layers, are obtained as well according to the chosen colors. Next, color values of the equal grayscale layers are obtained based on a fixed grayscale level and compared with color values listed in a color contrast table as shown in FIG. 6. For example, the color value of layer 6 is 0101, corresponding to pinkish red. Further, the color value of layer 12 is 1011 corresponding to dim cyan.

In step S7, each monochrome image block matches the color of corresponding equal grayscale layer, such that a color image converted from the monochrome image is obtained.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for converting monochrome images comprising steps of:

blocking a monochrome image;

obtaining pixel values of monochrome image blocks;

layered mapping of the monochrome image with equal grayscale to obtain color values of equal grayscale layers for the monochrome image;

assigning each of the equal grayscale layers a corresponding color; and matching the monochrome image blocks with colors corresponding to the equal grayscale layers according to the color values and the pixel values.

2. The method as claimed in claim 1, wherein the monochrome image is a 2-bit monochrome image.

3. The method as claimed in claim 1, wherein in the blocking step, the monochrome image is blocked in accordance with a minimum calculating unit of 2×2, 4×4 or 8×8.

4. The method as claimed in claim 3, wherein the 2×2 blocks has four sub-blocks each of which refers to a pixel.

5. The method as claimed in claim 4, wherein a pixel value of each monochrome image block is obtained by averaging pixel values of the sub-blocks thereof.

6. The method as claimed in claim 3, wherein in the blocking step, if the monochrome image block is not a multiplier of the minimum calculating unit, additional blocks must be added thereto to generate a multiplier of the minimum calculating unit.

7. The method as claimed in claim 1, wherein a bit number of the pixel values of the monochrome image blocks is defined according to desired color values.

8. The method as claimed in claim 7, wherein the number of the equal grayscale layers is defined according to defined color bits.

9. The method as claimed in claim 1, wherein each monochrome image block refers to an equal grayscale layer of the monochrome image.

10. The method as claimed in claim 1, wherein the equal grayscale layers of the monochrome image are defined by delimiting equal grayscale lines according to a density level of the minimum calculating unit.

* * * * *